(12) United States Patent
Kudo et al.

(10) Patent No.: US 7,869,154 B2
(45) Date of Patent: Jan. 11, 2011

(54) MAGNETIC TAPE DRIVING APPARATUS

(75) Inventors: Yoshiaki Kudo, Osaka (JP); Sadamu Kuse, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 30 days.

(21) Appl. No.: 12/404,962

(22) Filed: Mar. 16, 2009

(65) Prior Publication Data
US 2009/0231752 A1    Sep. 17, 2009

(30) Foreign Application Priority Data

Mar. 17, 2008 (JP) ............................. 2008-068237
Mar. 17, 2008 (JP) ............................. 2008-068238

(51) Int. Cl.
*G11B 19/02* (2006.01)
*G11B 5/10* (2006.01)

(52) U.S. Cl. ........................................ 360/69; 360/128
(58) Field of Classification Search ........................ None
See application file for complete search history.

(56) References Cited

U.S. PATENT DOCUMENTS 5,327,315 A * 7/1994 Nouchi et al. ............... 360/137
5,341,262 A * 8/1994 Yamasaki et al. ........... 360/128
6,028,734 A * 2/2000 Matsui ..................... 360/96.51
7,283,318 B2 * 10/2007 Brooks et al. ................ 360/69

FOREIGN PATENT DOCUMENTS

| JP | 62-146447 A | 6/1987 |
| JP | 5-81622 A | 4/1993 |
| JP | 6-44515 A | 2/1994 |
| JP | 8-45026 A | 2/1996 |

* cited by examiner

*Primary Examiner*—Andrew L Sniezek
(74) *Attorney, Agent, or Firm*—Birch, Stewart, Kolasch & Birch, LLP

(57) ABSTRACT

A magnetic tape driving apparatus includes a magnetic head (2), a temperature/humidity sensor (4), a Peltier element (11), and a controller (15). The temperature/humidity sensor (4) that detects the temperature and humidity of the magnetic head (2) or in the vicinity thereof. The Peltier element (11) that cools the magnetic head (2) and in the vicinity thereof based on detection results of the temperature/humidity sensor (4). The controller (15) that controls the Peltier element (11) based on the temperature and humidity information obtained by the temperature/humidity sensor (4). The controller (15) controls the Peltier element (11) so as to decrease the temperature of the magnetic head (2) and in the vicinity thereof when the humidity of the magnetic head (2) or in the vicinity thereof that the temperature/humidity sensor (4) detects is less than a predetermined value. By adopting this sort of configuration, it is possible to suppress an increase in error rate even in a low humidity environment.

12 Claims, 5 Drawing Sheets

MAGNETIC TAPE DRIVING APPARATUS

BACKGROUND OF THE INVENTION

1. Field of the Invention

The present invention relates to magnetic tape driving apparatuses. Specifically, the present invention relates to magnetic tape driving apparatuses that employ a magnetoresistance effect-type (MR) head, magnetic tape driving apparatuses that record various information to a high-capacity magnetic tape such as a computer tape, and magnetic tape driving apparatuses that are capable of reproducing various information that is recorded to a high-capacity magnetic tape.

2. Description of Related Art

Recently, there has been an increase in users that record (backup) a copy of data recorded to a hard disk installed in a computer to magnetic tape. In the field of magnetic tape for data backup, with the increasing capacity of hard disks, magnetic tape that has a recording capacity of several 100 gigabyte to several terabyte per roll of tape has been commercialized. In the future, in order to be compatible with further increased hard disk capacity, increased capacity of magnetic tape for data backup will be necessary.

In order to increase the capacity of magnetic tape, it is necessary to increase the linear recording density of magnetic tape. In order to increase the linear recording density of magnetic tape, it is necessary to finish the magnetic layer surface of the magnetic tape so as to be very smooth. However, when the magnetic layer surface of the magnetic tape is smoothly finished, there is a tendency for abrasion of the magnetic layer to decrease.

In this sort of a magnetic tape driving apparatus that performs recording and reproduction using magnetic tape, an MR head is often used in order to detect very small magnetic flux with short wavelength. In magnetic tape that has been recorded to at high density, magnetic flux is very small and has short wavelength. Accordingly, when a slight stain is affixed to the surface of the magnetic head, spacing increases between the surface of the magnetic head and the magnetic layer surface of the magnetic tape, reproduction output decreases due to a change in the bias magnetic field, and so there are problems such as that reproduction errors occur, increasing the error rate. This sort of phenomenon occurs markedly in a low humidity environment, and therefore is a significant problem.

Patent Document 1 (JP H5-81622A) discloses a configuration in which a magnetic head is provided with a cooling mechanism, with the object of improving magnetic recording properties. By adopting such a configuration, it is possible to avoid deterioration of the magnetic head or magnetic tape caused by heat generated by sliding.

Patent Document 2 (JP H8-45026A) discloses a method for increasing the sense current of an MR element, thus improving reproduction output.

The configuration disclosed in Patent Document 1 performs temperature control so as to start cooling when the temperature of the face opposing the magnetic recording medium of the magnetic head becomes increased relative to the other end. With the configuration disclosed in Patent Document 1, it is possible to avoid deterioration of the magnetic head and magnetic recording medium caused by heat generated by sliding, but no effects are exhibited with regard to increasing error rate due to staining in a low humidity environment.

With the configuration disclosed in Patent Document 2, Joule heat caused by the flow of sense current through the MR head is decreased, and by increasing the limited sense current it is possible to improve magnetic recording properties. However, no effects are exhibited with regard to increasing error rate due to staining in a low humidity environment.

On the other hand, with a magnetic tape driving apparatus, in a high humidity environment, the friction coefficient of the tape sliding face of the magnetic head is high, so it is difficult to keep a constant sliding speed of the magnetic tape. Thus, the magnetic head cannot properly read information from the magnetic tape, so a problem such as increased error rate occurs.

Patent Document 3 (JP H6-44515A) discloses a configuration in which the tape sliding face of the magnetic head is coated with a material having good wettability. However, with the configuration disclosed in Patent Document 3, because temperature and humidity are not monitored, it is difficult to keep a constant humidity of the magnetic head.

Patent Document 4 (JP S62-146447A) discloses a configuration in which temperature and humidity of the magnetic head are monitored. However, because a case of a video tape recorder in which a cylinder in which a magnetic head is provided and a humidity sensor are disposed is comparatively large, there is variation of the temperature and humidity within the case, so it is difficult to control the humidity. Accordingly, when used in a high humidity environment, it is possible that a phenomenon will occur in which the magnetic tape sticks to the magnetic head.

SUMMARY OF THE INVENTION

It is an object of the present invention to provide a magnetic tape driving apparatus that is capable of suppressing an increase in error rate even when used in a low humidity environment and/or a high humidity environment.

A first magnetic tape driving apparatus of the invention is a magnetic tape driving apparatus having a transport means that transports a magnetic tape, and a magnetic head that is capable of writing information to the magnetic tape transported by the transport means, or reading information that has been recorded to the magnetic tape. The magnetic tape driving apparatus including: a detection means that detects the temperature and humidity of the magnetic head or in the vicinity of the magnetic head; a temperature adjusting means capable of adjusting the temperature of the magnetic head or in the vicinity of the magnetic head; and a control means that controls the temperature adjusting means based on the temperature and humidity detected with the detection means. The control means controlling the temperature adjusting means so as to decrease the temperature of the magnetic head and in the vicinity of the magnetic head when the humidity of the magnetic head or in the vicinity of the magnetic head that the detection means detects is less than a predetermined value. The control means controlling the temperature adjusting means so as to increase the temperature of the magnetic head and in the vicinity of the magnetic head when the humidity of the magnetic head or in the vicinity of the magnetic head that the detection means detects is higher than a predetermined value.

A second magnetic tape driving apparatus of the invention is a magnetic tape driving apparatus having a transport means that transports a magnetic tape, and a magnetic head that is capable of writing information to the magnetic tape transported by the transport means, or reading information that has been recorded to the magnetic tape. The magnetic tape driving apparatus comprising: a detection means that detects the temperature and humidity of the magnetic head or in the vicinity of the magnetic head; a cooling means capable of decreasing the temperature of the magnetic head or in the vicinity of the magnetic head; and a control means that controls the cooling means based on the temperature and humidity detected with the detection means. The control means controlling the cooling means so as to decrease the temperature of the magnetic head and in the vicinity of the magnetic head when the humidity of the magnetic head or in the vicinity of the magnetic head that the detection means detects is less than a predetermined value.

According to the invention, it is possible to increase the relative humidity of the area near the magnetic head to greater than the relative humidity of the environment in which the magnetic tape driving apparatus is installed. Thus it is possible to suppress an increase in error rate even when the magnetic tape driving apparatus is used in a low humidity environment.

A third magnetic tape driving apparatus of the invention is a magnetic tape driving apparatus having a magnetic tape cartridge housing, a transport means that transports a magnetic tape that has been housed in the magnetic tape cartridge, a reeling unit that reels in magnetic tape that has been drawn out from the magnetic tape housed in the magnetic tape cartridge, and a magnetic head that performs recording/reproduction of information on the magnetic tape. The magnetic tape driving apparatus including: a cooling means capable of decreasing the temperature of the magnetic head or in the vicinity of the magnetic head; a detection means that detects the temperature and humidity of the magnetic head or in the vicinity of the magnetic head; and a control means that controls the cooling means based on information of the temperature and humidity obtained with the detection means. The control means controlling the cooling means so as to decrease the temperature of the magnetic head and in the vicinity of the magnetic head when the humidity of the magnetic head or in the vicinity of the magnetic head that the detection means detects is less than a predetermined value.

A fourth magnetic tape driving apparatus of the invention is a magnetic tape driving apparatus having a transport means that transports a magnetic tape, and a magnetic head that is capable of writing information to the magnetic tape transported by the transport means, or reading information that has been recorded to the magnetic tape. The magnetic tape driving apparatus including: a case in which the magnetic head is housed; a detection means that is disposed within the case and detects the temperature and humidity within the case; a heating means capable of increasing the temperature within the case; and a control means that controls the heating means based on the humidity detected with the detection means. The control means controlling the heating means so as to increase the temperature within the case when the humidity within the case that the detection means detects is higher than a predetermined value.

According to the present invention, it is possible to suppress an increase in error rate even when the magnetic tape driving apparatus is used in a low humidity environment and/or a high humidity environment.

DETAILED DESCRIPTION OF THE INVENTION

Figure 1:
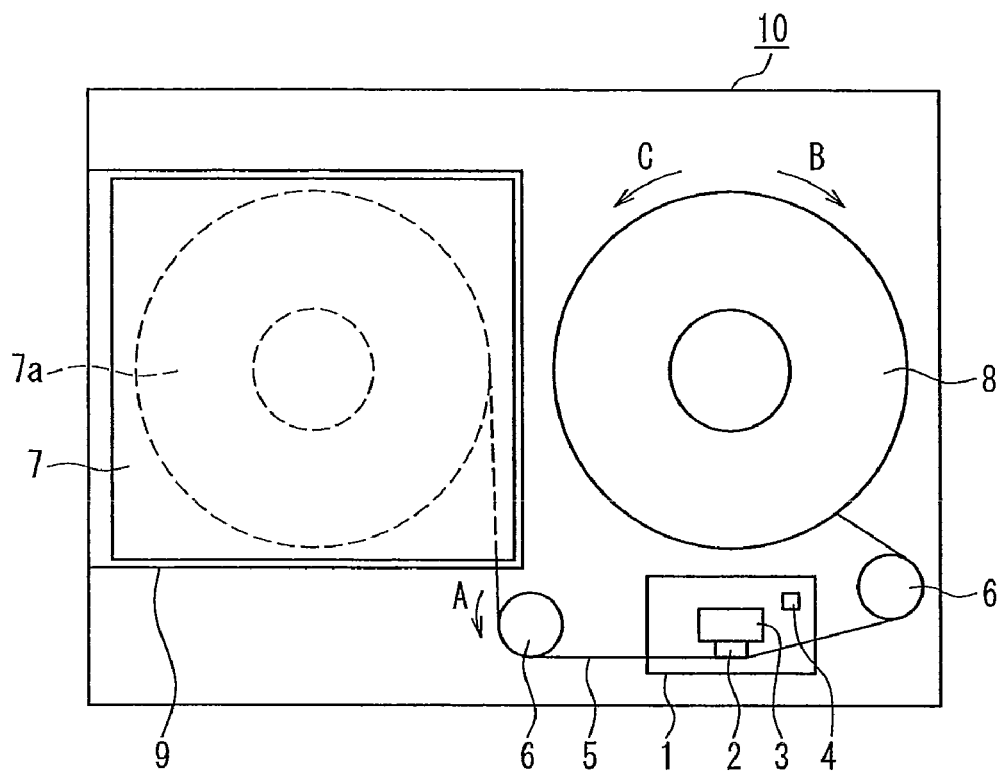
FIG. 1 is a plan view that schematically shows the configuration of a first magnetic tape driving apparatus according to an embodiment.

A first magnetic tape driving apparatus of the invention is a magnetic tape driving apparatus having a transport means that transports a magnetic tape, and a magnetic head that is capable of writing information to the magnetic tape transported by the transport means, or reading information that has been recorded to the magnetic tape. The magnetic tape driving apparatus including: a detection means that detects the temperature and humidity of the magnetic head or in the vicinity of the magnetic head; a temperature adjusting means capable of adjusting the temperature of the magnetic head or in the vicinity of the magnetic head; and a control means that controls the temperature adjusting means based on the temperature and humidity detected with the detection means. The control means controlling the temperature adjusting means so as to decrease the temperature of the magnetic head and in the vicinity of the magnetic head when the humidity of the magnetic head or in the vicinity of the magnetic head that the detection means detects is less than a predetermined value. The control means controlling the temperature adjusting means so as to increase the temperature of the magnetic head and in the vicinity of the magnetic head when the humidity of the magnetic head or in the vicinity of the magnetic head that the detection means detects is higher than a predetermined value.

A second magnetic tape driving apparatus of the invention is a magnetic tape driving apparatus having a transport means that transports a magnetic tape, and a magnetic head that is capable of writing information to the magnetic tape transported by the transport means, or reading information that has been recorded to the magnetic tape. The magnetic tape driving apparatus comprising: a detection means that detects the temperature and humidity of the magnetic head or in the vicinity of the magnetic head; a cooling means capable of decreasing the temperature of the magnetic head or in the vicinity of the magnetic head; and a control means that controls the cooling means based on the temperature and humidity detected with the detection means. The control means controlling the cooling means so as to decrease the temperature of the magnetic head and in the vicinity of the magnetic head when the humidity of the magnetic head or in the vicinity of the magnetic head that the detection means detects is less than a predetermined value. With such a configuration, it is possible to increase the relative humidity of the area near the magnetic head to greater than the relative humidity of the environment in which the magnetic tape driving apparatus is installed, and thus suppress the occurrence of staining of the magnetic tape. Thus, it is possible to suppress an increase in error rate even when the magnetic tape driving apparatus is used in a low humidity environment.

A third magnetic tape driving apparatus of the invention is a magnetic tape driving apparatus having a magnetic tape cartridge housing, a transport means that transports a magnetic tape that has been housed in the magnetic tape cartridge, a reeling unit that reels in magnetic tape that has been drawn out from the magnetic tape housed in the magnetic tape cartridge, and a magnetic head that performs recording/reproduction of information on the magnetic tape. The magnetic tape driving apparatus including: a cooling means capable of decreasing the temperature of the magnetic head or in the vicinity of the magnetic head; a detection means that detects the temperature and humidity of the magnetic head or in the vicinity of the magnetic head; and a control means that controls the cooling means based on information of the temperature and humidity obtained with the detection means. The control means controlling the cooling means so as to decrease the temperature of the magnetic head and in the vicinity of the magnetic head when the humidity of the magnetic head or in the vicinity of the magnetic head that the detection means detects is less than a predetermined value. With such a configuration, it is possible to increase the relative humidity of the area near the magnetic head to greater than the relative humidity of the environment in which the magnetic tape driving apparatus is installed, and thus suppress the occurrence of staining of the magnetic tape. Thus, it is possible to suppress an increase in error rate even when the magnetic tape driving apparatus is used in a low humidity environment.

In the magnetic tape driving apparatus of the invention, it is possible to adopt a configuration in which a case that houses the magnetic head, the detection means, and the cooling means is provided. With such a configuration, the space in which the detection means detects temperature and humidity becomes only the space within the case, so it is possible to quickly detect changes in the temperature of the magnetic head and in the vicinity thereof. Thus, it is possible to suppress the occurrence of staining of the magnetic tape, and thereby suppress an increase in error rate even when the magnetic tape driving apparatus is used in a low humidity environment.

In the magnetic tape driving apparatus of the invention, the cooling means can be configured with a Peltier element. With such a configuration, it is possible to adjust the temperature of the magnetic head and in the vicinity thereof according to the magnitude of current, so it is possible to realize the cooling means with a simple configuration.

In the magnetic tape driving apparatus of the invention, it is possible to adopt a configuration in which the cooling means is joined to the back face of a magnetic tape sliding face of the magnetic head. With such a configuration, it is possible to quickly detect changes in the temperature of the magnetic head. Thus, it is possible to suppress the occurrence of staining of the magnetic tape, and thereby suppress an increase in error rate even when the magnetic tape driving apparatus is used in a low humidity environment.

In the magnetic tape driving apparatus of the invention, it is possible to adopt a configuration in which the magnetic tape driving apparatus further includes an outside air introduction unit that is formed on a surface of the case and has a space in communication with the inside and outside of the case, and a fan disposed in the internal space of the outside air introduction unit. The cooling means is disposed inside of the outside air introduction unit. The fan introduces air that has been cooled with the cooling means into the case. With such a configuration, it is possible to suppress the occurrence of staining of the magnetic tape, and thereby suppress an increase in error rate even when the magnetic tape driving apparatus is used in a low humidity environment.

A fourth magnetic tape driving apparatus of the invention is a magnetic tape driving apparatus having a transport means that transports a magnetic tape, and a magnetic head that is capable of writing information to the magnetic tape transported by the transport means, or reading information that has been recorded to the magnetic tape. The magnetic tape driving apparatus including: a case in which the magnetic head is housed; a detection means that is disposed within the case and detects the temperature and humidity within the case; a heating means capable of increasing the temperature within the case; and a control means that controls the heating means based on the humidity detected with the detection means. The control means controlling the heating means so as to increase the temperature within the case when the humidity within the case that the detection means detects is higher than a predetermined value. With such a configuration, it is possible to decrease the relative humidity inside the case in which the magnetic head is housed to less than the relative humidity of the environment in which the magnetic tape driving apparatus is installed. Thus, it is possible to prevent the magnetic tape from sticking to the magnetic head and thereby suppress an increase in error rate even when the magnetic tape driving apparatus is used in a high humidity environment. Also, because the case is configured with a small space that covers the magnetic head, by only disposing a small heating means in a part of that space, it is possible to approximately uniformly control the temperature in the space to a predetermined temperature range. Accordingly, it is also possible to easily control the humidity within the case.

In the magnetic tape driving apparatus of the invention, the heating means can be configured with a Peltier element. With such a configuration, it is possible to adjust the amount of heat generated by controlling the amount of current that flows through the Peltier element, so it is possible to adjust the temperature within the case. Also, by changing the direction of current that flows through the Peltier element, it is possible to easily switch the cooling position and the heat generating position in the Peltier element. Thus, it is possible to heat or cool the magnetic head as necessary.

In the magnetic tape driving apparatus of the invention, it is possible to adopt a configuration in which the heating means is joined to the back face of a magnetic tape sliding face of the magnetic head. With such a configuration, it is possible to quickly detect changes in the temperature of the magnetic head.

In the magnetic tape driving apparatus of the invention, it is possible to adopt a configuration in which the magnetic tape driving apparatus further includes an outside air introduction unit that is formed on a surface of the case and has a space in communication with the inside and outside of the case, and a fan disposed in the internal space of the outside air introduction unit. The heating means is disposed inside of the outside air introduction unit. The fan introduces air that has been heated with the heating means into the case. With such a configuration, it is possible to decrease the relative humidity inside the case in which the magnetic head is housed to less than the relative humidity of the environment in which the magnetic tape driving apparatus is installed. Thus, it is possible to prevent the magnetic tape from sticking to the magnetic head and thereby suppress an increase in error rate even when the magnetic tape driving apparatus is used in a high humidity environment.

Embodiment 1

[1. Configuration of First Magnetic Tape Driving Apparatus]

Figure 2:
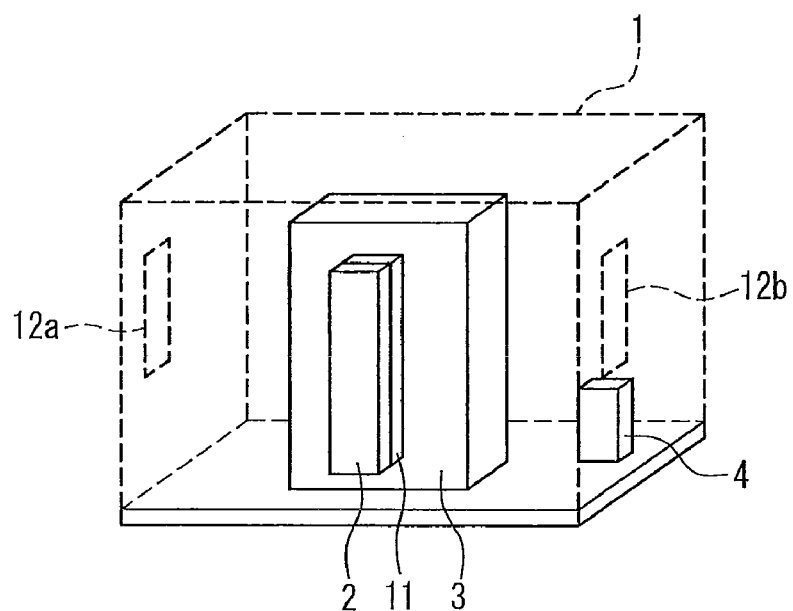
FIG. 2 is a perspective view of a humidity controller in the first magnetic tape driving apparatus.
Figure 3:
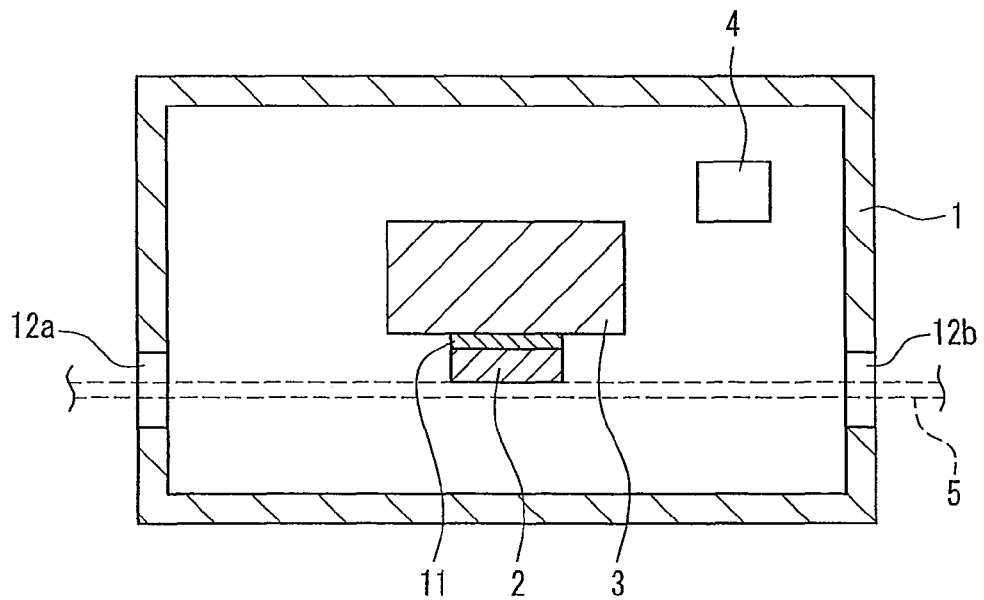
FIG. 3 is a cross-sectional view of the humidity controller in the first magnetic tape driving apparatus.

FIG. 1 is a plan view that schematically shows the internal configuration of a magnetic tape driving apparatus that is an example of the present invention. FIG. 2 is a perspective view that shows an external view of a humidity controller 1, in which for ease of understanding the internal structure, the humidity controller 1 is drawn with broken lines and the internal structure is drawn with solid lines. FIG. 3 is a cross-sectional view of the humidity controller 1 shown in FIG. 2, broken at a horizontal plane that passes through a magnetic head 2 and holes 12a and 12b. For the sake of convenience, a Peltier element 11 is not depicted in FIG. 1, but is clearly depicted in FIGS. 2 and 3.

A magnetic tape driving apparatus 10 according to Embodiment 1 is provided with the humidity controller 1, the magnetic head 2, an actuator 3, a temperature/humidity sensor 4, tape guides 6, a winding reel 8, a cartridge housing 9, and the Peltier element 11. An example of the magnetic tape driving apparatus according to Embodiment 1 is a drive in which it is possible to use a magnetic tape compliant with LTO specifications (LTO: Linear Tape Open).

When writing information to the magnetic tape with the drive, while transporting the magnetic tape from the starting end to the finishing end, a data track that includes information is formed on a recording face of the magnetic tape with the magnetic head. When the magnetic tape is transported to the finishing end, next the magnetic head is moved a predetermined amount in the width direction of the magnetic tape. Then, while transporting the magnetic tape from the finishing end to the starting end, a data track that includes information is formed on a recording face of the magnetic tape with the magnetic head. Afterward, the above operation is repeated to form a plurality of parallel data tracks in the lengthwise direction of the magnetic tape.

The humidity controller 1 is provided with a box-like case, and is disposed so as to cover the magnetic head 2, the actuator 3, and so on. The holes 12a and 12b are formed in a pair of opposed side faces of the humidity controller 1. The holes 12a and 12b have a size such that at least a magnetic tape 5 (including a guide pin disposed at an end of the magnetic tape 5) can be inserted through the holes 12a and 12b. The humidity controller 1 is provided with a small space covering the magnetic head 2 and the magnetic head actuator 3, so by only disposing a small Peltier element 11 in a part of that space, it is possible to approximately uniformly control the temperature in the space to a predetermined temperature range. Accordingly, it is also possible to easily control the humidity within the humidity controller 1.

The magnetic head 2 can write information to the magnetic tape 5. The magnetic head 2 can read information that is recorded to the magnetic tape 5. In Embodiment 1, the magnetic head 2 is an MR head provided with a magnetoresistance effect element (MR element).

The actuator 3 is capable of moving the magnetic head 2 in the width direction of the magnetic tape 5 when recording information to the magnetic tape 5, or when reading information that has been recorded to the magnetic tape 5.

The temperature/humidity sensor 4 is disposed within the humidity controller 1. The temperature/humidity sensor 4 is capable of detecting the temperature and humidity in the internal space of the humidity controller 1. In Embodiment 1, the temperature/humidity sensor 4 is placed on the inside bottom face of the humidity controller 1, but this location is an example.

The tape guides 6 are capable of guiding the magnetic tape 5 such that the magnetic tape 5 can run through a predetermined position within the magnetic tape driving apparatus 10. The tape guides 6 are provided with approximately cylindrically shaped rollers. The magnetic tape 5 is wound around the cylindrical face of the rollers. The tape guides 6 are respectively disposed on the in-side and the out-side of the magnetic head 2, and regulate the position of the magnetic tape 5 relative to the magnetic head 2.

The winding reel 8 is a reel around which is wound the magnetic tape 5 that has been pulled out from a magnetic tape cartridge 7. The winding reel 8 is rotationally driven by a motor (not shown). By rotating the winding reel 8 in the direction indicated by arrow B, it is possible to transport the magnetic tape 5 in the direction indicated by arrow A. By rotating the winding reel 8 in the direction indicated by arrow C, it is possible to transport the magnetic tape 5 in the direction opposite to that indicated by arrow A.

The cartridge housing 9 is capable of housing the magnetic tape cartridge 7. The cartridge housing 9 is provided with a driving means that is capable of rotationally driving a reel 7a housed within the magnetic tape cartridge 7.

The Peltier element 11 (cooling means in Embodiment 1) is disposed within the humidity controller 1. The Peltier element 11 is provided with a plurality of metallic conductors that are connected to each other. By causing current in a predetermined direction to flow through the metallic conductors, the temperature is increased at one junction between the metallic conductors, and the temperature is decreased at another junction between the metallic conductors. By reversing the direction of the current that flows through the metallic conductors, the temperature is decreased in one junction between the metallic conductors, and the temperature is increased in the other junction between the metallic conductors. By changing the magnitude of the current that flows through the metallic conductors, it is possible to change the temperature at the junctions. In Embodiment 1, the Peltier element 11 is disposed on the back face side of the magnetic head 2 relative to the magnetic tape sliding face (the face where a head chip is disposed).

Figure 4:
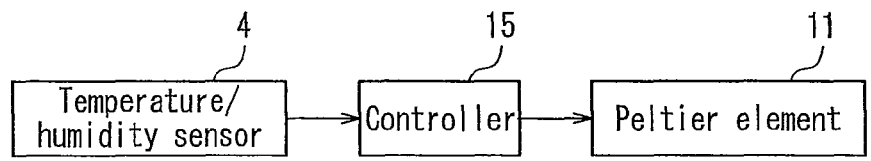
FIG. 4 is a block diagram of operation control of a Peltier element according to an embodiment.

FIG. 4 shows a block diagram of the configuration that performs operation control of the Peltier element 11. A controller 15, based on the temperature and humidity detected in the temperature/humidity sensor 4, controls the amount of current that flows through the Peltier element 11, and thus is capable of controlling the temperature of the magnetic head 2 and in the vicinity thereof. In Embodiment 1, the controller 15 performs control such that if the temperature/humidity sensor 4 detects that the humidity of the magnetic head 2 and in the vicinity thereof is less than a predetermined value, the controller 15 increases the amount of current that flows through the Peltier element 11, reducing the temperature of the magnetic head 2 and in the vicinity thereof, and thus increasing the relative humidity.

In the magnetic tape driving apparatus of Embodiment 1, when recording various information to the magnetic tape 5, first, the magnetic tape cartridge 7 is housed in the cartridge housing 9, and a loading operation of the magnetic tape 5 is performed. When the loading operation of the magnetic tape 5 is completed, a tape path in which the magnetic tape 5 contacts the magnetic head 2 and the tape guides 6 is formed, as shown in FIG. 1. In this state, by rotating the winding reel 8 in the direction indicated by arrow B with a driving means such as a motor, it is possible to transport the magnetic tape 5 in the direction indicated by arrow A. Next, by applying electric power to the magnetic head 2, a data track is formed in a predetermined data band in a recording face of the magnetic tape 5, so that information can be recorded. Note that a description of operation to reproduce information that has been written to the magnetic tape 5 is omitted.

When the magnetic tape driving apparatus 10 is disposed in a low humidity environment (for example, where relative humidity is less than 20% RH), there is a possibility that deterioration of the magnetic tape 5 will occur, and thus that staining will occur. In Embodiment 1, the temperature and humidity within the humidity controller 1 are monitored with the temperature/humidity sensor 4, and that temperature/humidity information is sent to the controller 15 (see FIG. 4). The controller 15 performs control such that when the humidity being detected with the temperature/humidity sensor 4 has become less than a predetermined value, current is caused to flow through the Peltier element 11. Alternatively, the controller 15 performs control such that when current is already flowing to the Peltier element 11, the controller 15 increases the amount of current flowing through the Peltier element 11. Due to being current-controlled by the controller 15, the Peltier element 11 is capable of cooling the magnetic head 2 as a whole. Thus, the Peltier element 11 is capable of increasing the relative humidity of the magnetic head 2 and in the vicinity thereof.

Figure 7:
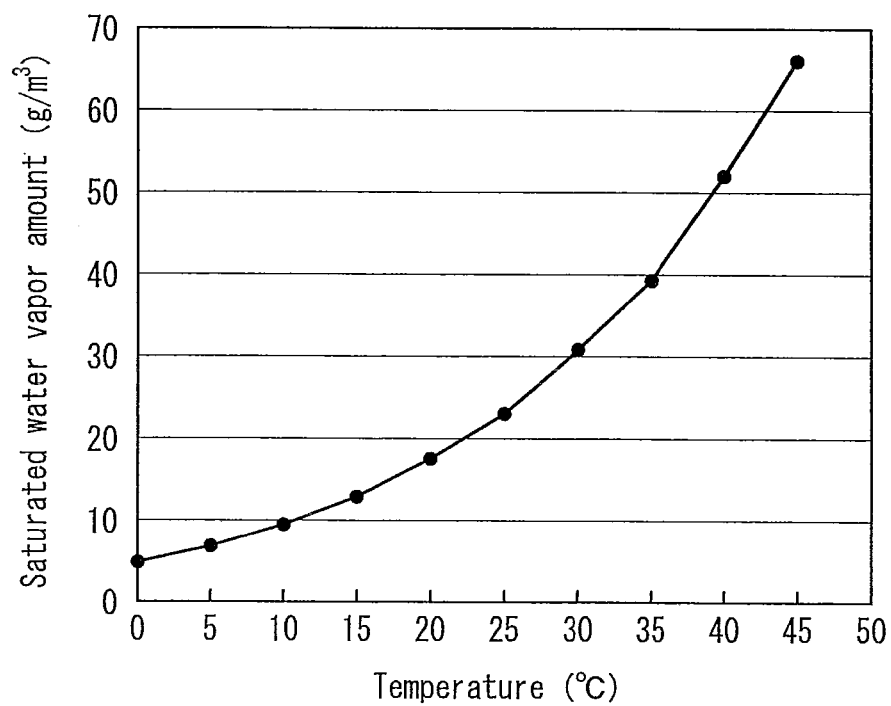
FIG. 7 is a graph that shows the relationship between temperature and the saturated water vapor amount contained in the air.

That is, when current in a predetermined direction is caused to flow through the Peltier element 11, the side of the Peltier element 11 that contacts the magnetic head 2 is cooled by the Peltier effect of the Peltier element 11, and heat is generated on the back side (actuator 3 side) of the Peltier element 11. The heat produced on the back side of the Peltier element 11 is sent outside of the humidity controller 1 by a heat pipe (not shown), and externally released. Thus, because the inside temperature of the humidity controller 1 becomes less than the outside temperature, the relative humidity inside of the humidity controller 1 increases. For example, when the temperature of the environment in which the magnetic tape driving apparatus 10 is installed is 25° C., and the humidity is 20% RH, as shown in FIG. 7, the saturated water vapor amount is 23.1 (g/m³), so a water vapor amount w1 is:

$$w1 = 23.1 \times 0.2 = 4.62 (g/m^3).$$

When the ambient atmosphere is lowered from 25° C. to 10° C. in this state, the saturated water vapor amount at 10° C. becomes 9.4 (g/m³), so at this time a relative humidity h1 is:

$$h1 = 4.62/9.4 \times 100 = 49.1 (\% \ RH).$$

Accordingly, it is possible to raise the relative humidity from 20% RH to 49.1% RH.

The temperature/humidity sensor 4 is disposed within the humidity controller 1. The controller 15 is capable of controlling the amount of current that flows through the Peltier element 11 based on the temperature and humidity information that has been detected in the temperature/humidity sensor 4, and thus is capable of controlling the inside of the humidity controller 1 to a desired humidity. The humidity controller 1 has a small space that covers the magnetic head 2 and the actuator 3, so by only disposing a small Peltier element 11 in a part of that space, it is possible to approximately uniformly control the temperature in the space to a predetermined temperature range. Accordingly, it is also possible to easily control the humidity within the humidity controller 1.

[2. Configuration of Second Magnetic Tape Driving Apparatus]

Figure 5:
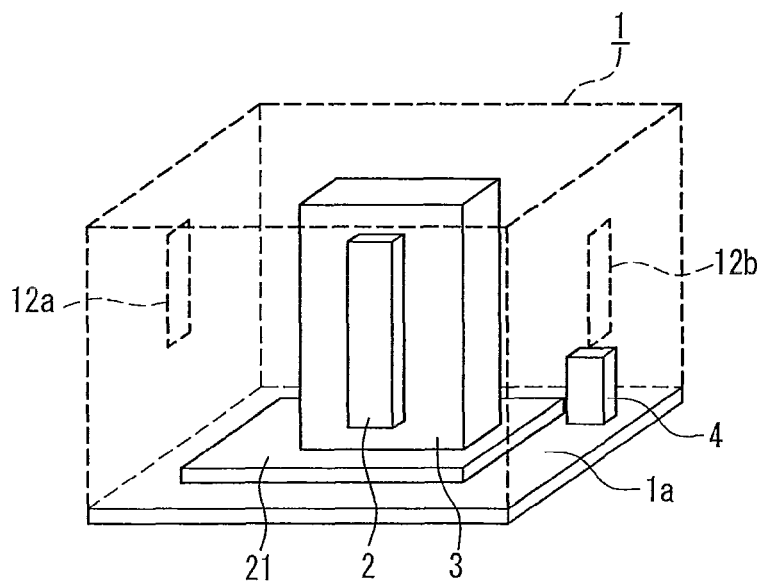
FIG. 5 is a perspective view of a humidity controller in a second magnetic tape driving apparatus.

FIG. 5 shows the configuration of a humidity controller in a magnetic tape driving apparatus of Embodiment 1. A Peltier element 21 is disposed on a bottom face 1a inside of a humidity controller 1. The bottom face of the Peltier element 21 contacts the bottom face 1a of the humidity controller 1. On the top face of the Peltier element 21, an actuator 3 provided with a magnetic head 2 is disposed. In FIG. 5, the configuration other than the Peltier element 21 is the same as the configuration of the first magnetic tape driving apparatus described above, and so a description thereof is omitted.

In FIG. 5, when current is caused to flow through the Peltier element 21, the inner face side (magnetic head 2 side) of the humidity controller 1 of the Peltier element 21 is cooled, and heat is generated on the back side (bottom face 1a side). The heat produced on the back side of the Peltier element 21 is released to the outside via the case of the humidity controller 1. Thus, because the inside of the humidity controller 1 is cooled to a temperature less than the outside of the humidity controller 1, the relative humidity of the inside increases.

[3. Configuration of Third Magnetic Tape Driving Apparatus]

Figure 6:
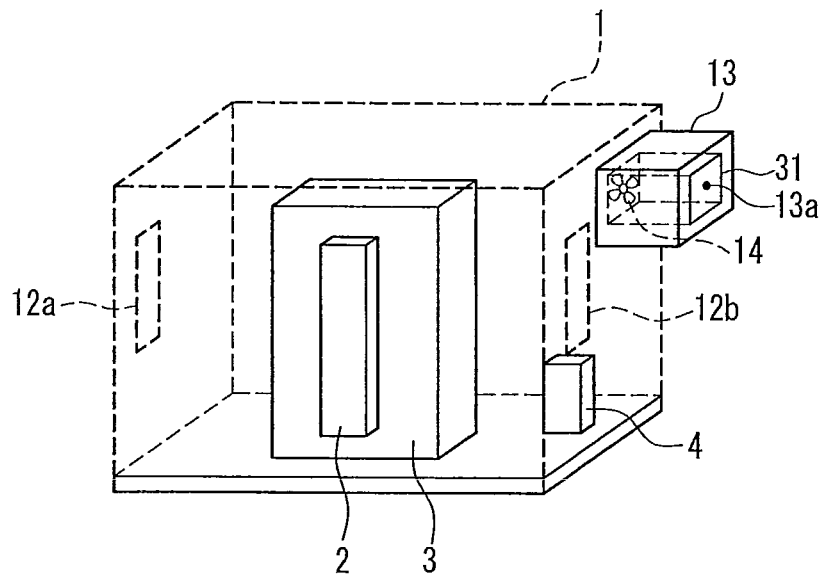
FIG. 6 is a perspective view of a humidity controller in a third magnetic tape driving apparatus.

FIG. 6 shows the configuration of a humidity controller in a magnetic tape driving apparatus of Embodiment 1. In Embodiment 1, a Peltier element 31 (a cooling means) is disposed on an inner face of an outside air introduction unit 13.

The outside air introduction unit 13 is disposed on an outer face of the humidity controller 1. The outside air introduction unit 13 includes a through hole 13a that is in connection with the outside and the inside of the humidity controller 1. The Peltier element 31 is disposed on an inner face of the through hole 13a. A fan 14 is disposed within the through hole 13a.

The fan 14 is rotationally driven by a separately provided driving means such as a motor. The fan 14, by being rotated, is capable of evacuating air in the humidity controller 1 to the outside via the through hole 13a, and introducing outside air into the humidity controller 1 via the through hole 13a. The fan 14 can be configured to be rotationally driven/controlled by the controller 15 (see FIG. 4).

The configuration other than the above is the same as the configuration of the previously described first magnetic tape driving apparatus, so a description thereof is omitted.

In FIG. 6, when current in a predetermined direction is caused to flow through the Peltier element 31, the inner face side of the outside air introduction unit 13 of the Peltier element 31 is cooled, and the back side (outer face of the outside air introduction unit 13) generates heat. Because the outside air introduction unit 13 is disposed on the outer face of the humidity controller 1, the heat produced on the back side of the Peltier element 31 is released to the outside. Thus, the temperature inside of the outside air introduction unit 13 becomes less than the outside temperature.

Furthermore, by rotationally driving the fan 14 to introduce outside air, air that has been cooled within the outside air introduction unit 13 is fed into the humidity controller 1, and thus the temperature within the humidity controller 1 decreases. When the inside temperature of the humidity controller 1 decreases, the inside relative humidity increases.

[4. Effects, etc. of Embodiment]

According to Embodiment 1, the Peltier element 11 is disposed on the back face of the magnetic head 2, and by controlling the amount of current that flows through the Peltier element 11 based on the temperature and humidity detected with the temperature/humidity sensor 4, it is possible to reduce the temperature of the magnetic head 2 and in the vicinity thereof. Thus, it is possible to increase the relative humidity of the magnetic head 2, and possible to suppress the occurrence of staining. Therefore, it is possible to suppress an increase in error rate of the magnetic tape 5.

Also, by adopting a configuration in which the magnetic head 2, the temperature/humidity sensor 4, and the Peltier element 11 are housed in the humidity controller 1 (case), so it is possible to quickly detect changes in the humidity and temperature of the magnetic head 2 and in the vicinity thereof. The space in which the temperature and humidity are detected in the temperature/humidity sensor 4 is only the space within the humidity controller 1.

In addition, by realizing a cooling means with the Peltier element 11, it is possible to adjust the temperature of the magnetic head 2 and in the vicinity thereof according to the magnitude of current, so it is possible to change the relative humidity of the magnetic head 2 and in the vicinity thereof with a simple configuration.

In addition, due to the Peltier element 11 being joined to the back face of the magnetic tape sliding face of the magnetic head 2, it is possible to quickly change the temperature and humidity of the magnetic head 2 and in the vicinity thereof. Thus, it is possible to suppress the occurrence of staining of the magnetic tape 5, and to suppress an increase in error rate of the magnetic tape 5 even in a low humidity environment.

Also, it is possible to adopt a configuration in which the Peltier element 31 is disposed in the outside air introduction unit 13 disposed on the outside face of the humidity controller 1, and the fan 14 is provided in order to introduce air that has been cooled with the Peltier element 31 into the humidity controller 1. By controlling the amount of current that flows through the Peltier element 31 based on the temperature and humidity detected with the temperature/humidity sensor 4 to cool the air, and introducing the cooled air into the humidity controller 1 using the fan 14, it is possible to reduce the temperature inside of the humidity controller 1. By reducing the temperature inside of the humidity controller 1, it is possible to increase the relative humidity inside of the humidity controller 1. By increasing the relative humidity inside of the humidity controller 1, it is possible to suppress the occurrence of staining. Thus it is possible to suppress an increase in the error rate of the magnetic tape 5.

Note that in the third magnetic tape driving apparatus in Embodiment 1, the Peltier element 31 is disposed on the inside face of the outside air introduction unit 13. But the same effects as in Embodiment 1 can be obtained by adopting a configuration in which four approximately plate-like Peltier elements are attached together so as to form an outside air introduction unit provided with a hole.

In addition, in Embodiment 1, the temperature/humidity sensor 4 is a single unit, but separate units may be used for a temperature sensor and a humidity sensor.

In addition, in Embodiment 1, the disposed positions of the Peltier elements 11, 21, and 31 are only examples. As long as it is possible to use a Peltier element to reduce the temperature of the magnetic head 2 and in the vicinity thereof, or the temperature within the humidity controller 1, and thus increase the relative humidity, the positions indicated in Embodiment 1 are not limitations.

In addition, the Peltier elements 11, 21, and 31 in Embodiment 1 are examples of a cooling means of the invention. The temperature/humidity sensor 4 in Embodiment 1 is an example of a detection means of the invention. The configuration that transports the magnetic tape 5, such as the winding reel 8 and the tape guide 6, in Embodiment 1 is an example of a transport means of the invention. The humidity controller 1 in Embodiment 1 is an example of a case of the invention. The controller 15 in Embodiment 1 is an example of a control means of the invention.

5. Examples of Magnetic Tape Driving Apparatus

The problem of an increase in error rate in a low humidity environment occurs in various states depending on the combination of magnetic tape and magnetic tape driving apparatus that are used. Normally, an increase in error rate is likely to occur when humidity becomes less than 20% RH, and the magnetic tape is likely to stick to the magnetic head when humidity exceeds 80% RH. Accordingly, it is preferable that the humidity within the humidity controller is controlled to a range of 20 to 80% RH, and more preferably is controlled to a range of 30 to 70% RH.

Below, the invention is more specifically described by use of examples, but the invention is not limited by these examples.

5-1. Example 1

First, non-magnetic coating and magnetic coating were applied on one primary face of polyester film with a thickness of 6 µm. The non-magnetic coating containing carbon black, acicular iron oxide powder, and a binder resin. The magnetic coating containing magnetic powder (average particle diameter 60 nm, retentive force Hc=149.6 kA/m (1880 oerstedalumina powder (average particle diameter 0.2 µm), and a binder resin.

Next, a drying process and a calendering process were performed on the polyester film to which the various coatings had been applied. Then, a non-magnetic layer with a thickness of 1.4 µm and a magnetic layer with a thickness of 0.15 µm were formed on the polyester film.

Next, a carbon coating containing carbon black, granular iron oxide powder, and a binder resin was applied on the other primary face of the polyester film.

Next, a drying process and a calendering process were performed on the polyester film to which the various coatings had been applied. Then, a backcoat layer with a thickness of 0.6 µm was formed on the polyester film, thus producing a jumbo roll.

Next, the jumbo roll was cut with a ½ inch width to produce a pancake tape. Then, a servo signal was recorded to the magnetic layer of the pancake tape using a servo writer, producing a magnetic tape for use with an LTO cartridge. This magnetic tape was incorporated into an LTO cartridge, and used as a magnetic tape for insulation.

The humidity controller 1 shown in FIG. 5 was incorporated into an LTO drive (Ultrium 960 drive made by Hewlett Packard Japan) to produce a magnetic tape driving apparatus according to the invention. With this magnetic tape driving apparatus in an environment of relative humidity 10% RH and temperature 45° C., durability running testing of the magnetic tape for evaluation was performed. The total capacity of the magnetic tape was written, and afterward, using an operation of reading the total capacity as one cycle, durability running testing of running 100 cycles was performed. At that time, the durability running testing was performed while controlling the amount of current that flowed to the Peltier element such that humidity in the humidity controller was about 50% RH.

5-2. Example 2

In Example 2, current was caused to flow through the Peltier element when the recording capacity of the magnetic tape (amount of data that can be written to the magnetic tape) had decreased to 75% of the recording capacity of the magnetic tape when starting the durability running testing.

Next, while controlling the amount of current such that the humidity within the humidity controller was about 50% RH, running of 100 cycles was performed. The content of durability running testing other than the above was the same as in Example 1.

5-3. Example 3

In Example 3, confirming the humidity control effect due to cooling the inside of the humidity controller using the Peltier element.

First, durability running testing was started without causing current to flow through the Peltier element, followed by waiting until a decrease (deterioration) in the recording capacity of the magnetic tape of at least 10% from the recording capacity when starting durability running testing was observed.

Next, the recording capacity of the magnetic tape deteriorated, the temperature within the humidity controller was decreased by 10° C. at each five cycles by controlling the amount of current that flowed to the Peltier element. In this durability running testing, the magnetic tape was run for 100 cycles. The content of durability running testing other than the above was the same as in Example 1.

5-4. Comparative Example 1

In Comparative Example 1, the magnetic tape was run for 100 cycles, without causing current to flow through the Peltier element from start to finish of the durability running testing. The content of durability running testing other than the above was the same as in Example 1.

[5-5. Evaluation of Running Durability]

Data was written to all data recordable regions of the magnetic tape, and afterward 100 cycles of running were performed, using reading of the data written to the magnetic tape as one cycle. The change in recording capacity accompanying the error rate increase was obtained for each cycle. Durability was evaluated using the amount of decrease in the capacity (recording capacity) of usable regions due to an increase in the error rate. The evaluation results are shown in Table 1 and Table 2. In Table 1 and Table 2, a zero decrease in the amount of recording capacity is indicated by 'A', a decrease of less than 10% in the amount of recording capacity is indicated by 'B', and a decrease of 10% or more in the amount of recording capacity is indicated by 'C'.

that according to the magnetic tape driving apparatus in Examples 1 and 2, regardless of the external temperature and humidity, by keeping an appropriate humidity in the vicinity of the magnetic head 2 (i.e. within the humidity controller 1), it is possible to suppress the occurrence of staining, and therefore suppress an increase in error rate that occurs due to staining.

Figure 9:
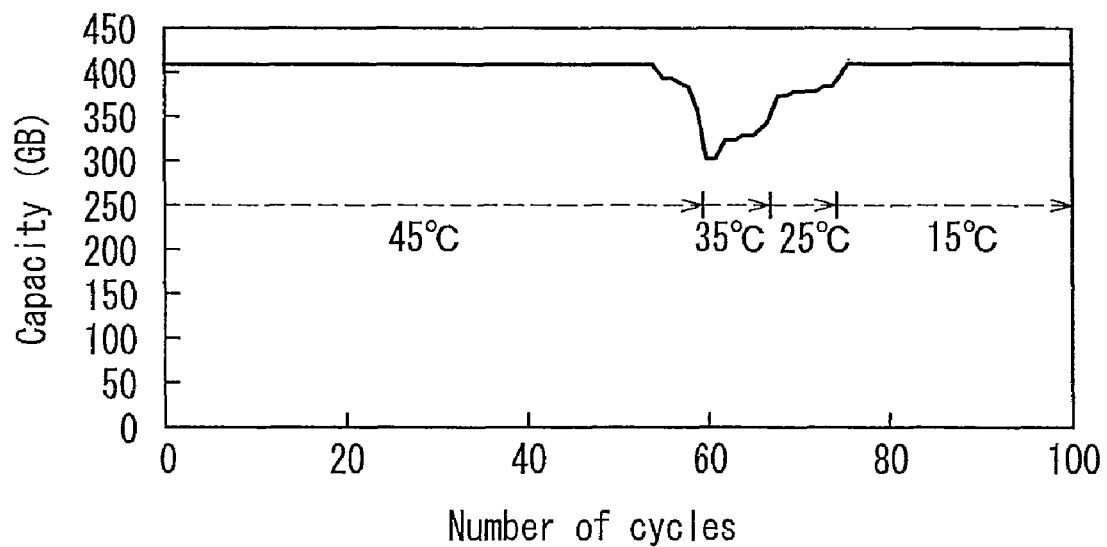
FIG. 9 is a graph that shows the relationship between the number of running cycles when a durability test was performed and usable capacity.

In addition, it was clear that, as indicated by 50 to 60 cycles in FIG. 9, when a state of low relative humidity (about 8% RH) continues within the humidity controller, staining occurs in the magnetic tape and thus the error rate increases. However, as is indicated by 60 cycles and thereafter in FIG. 9, due to reducing the temperature within the humidity controller by 10° C. at a time and thus increasing the relative humidity, it is possible to suppress the occurrence of staining in the magnetic tape, and thus suppress an increase in the error rate.

Embodiment 2

[1. Configuration of First Magnetic Tape Driving Apparatus]

A magnetic tape driving apparatus according to Embodiment 2 has the configuration shown in FIGS. 1 to 4. Accordingly, in Embodiment 2, the same constituent elements as in Embodiment 1 are given the same reference numerals, and a detailed description of those elements is omitted. In Embodiment 2, the operation of the humidity controller 1, the Peltier element 11, and the controller 15 differ from Embodiment 1.

The humidity controller 1 is provided with a box-like case, and is disposed so as to cover the magnetic head 2, the actuator 3, and the like. The through holes 12a and 12b are formed in a pair of opposed side faces of the humidity controller 1. The through holes 12a and 12b have a size such that at least the magnetic tape 5 (including a guide pin disposed at an end of the magnetic tape 5) can be inserted through the through

TABLE 1

| | \multicolumn{21}{c}{number of cycles} |
|---|---|---|---|---|---|---|---|---|---|---|---|---|---|---|---|---|---|---|---|---|---|
| | 1 | 5 | 10 | 15 | 20 | 25 | 30 | 35 | 40 | 45 | 50 | 55 | 60 | 65 | 70 | 75 | 80 | 85 | 90 | 95 | 100 |
| Ex. 1 | A | A | A | A | A | A | A | A | A | A | A | A | A | A | A | A | A | A | A | A | A |
| Ex. 2 | A | A | A | A | A | A | A | A | A | B | C | A | A | A | A | A | A | A | A | A | |
| Com. Ex. 1 | A | A | A | A | A | A | A | A | A | C | C | C | C | — | — | — | — | — | — | — | — |

TABLE 2

| | \multicolumn{21}{c}{number of cycles} |
|---|---|---|---|---|---|---|---|---|---|---|---|---|---|---|---|---|---|---|---|---|---|
| | 1 | 5 | 10 | 15 | 20 | 25 | 30 | 35 | 40 | 45 | 50 | 55 | 60 | 65 | 70 | 75 | 80 | 85 | 90 | 95 | 100 |
| Ex. 3 | A | A | A | A | A | A | A | A | A | A | A | B | C | C | B | A | A | A | A | A | A |
| humidity controller internal temperature (° C.) | | | | | | | 45 | | | | | | | 35 | 25 | | | | 15 | | |
| relative humidity (% RH) | | | | | | | 8 | | | | | | | 14 | 26 | | | | 48 | | |

Figure 8:
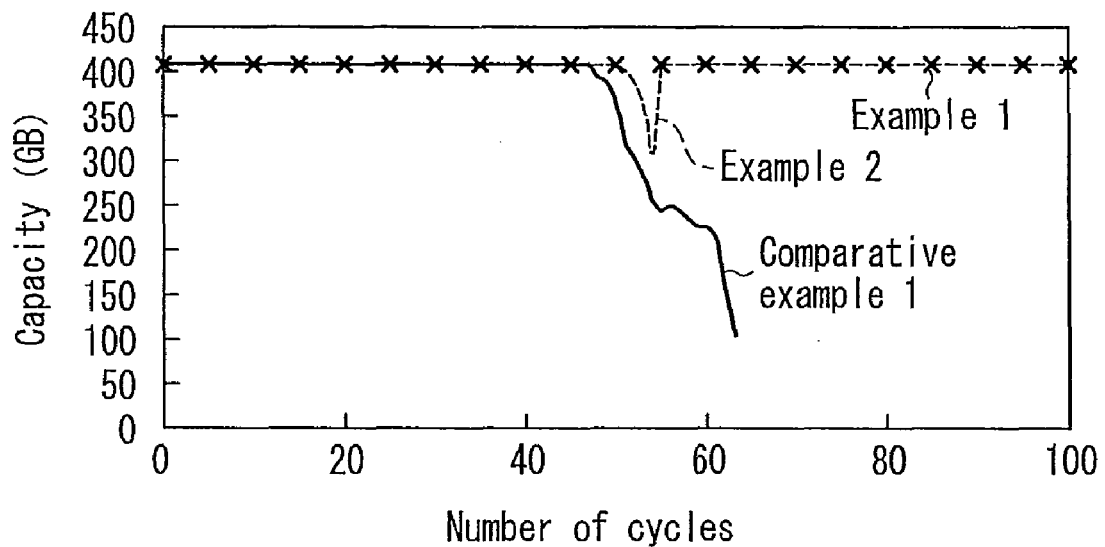
FIG. 8 is a graph that shows the relationship between the number of running cycles when a durability test was performed and usable capacity.

FIGS. 8 and 9 show changes in the recording capacity. As shown in FIG. 8, in Examples 1 and 2, almost no decrease in the recording capacity was observed in all 100 cycles, but in Comparative Example 1, a decrease in the recording capacity was observed from about 50 cycles onward. Thus, it was clear holes 12a and 12b. The humidity controller 1 is provided with a small space covering the magnetic head 2 and the magnetic head actuator 3. Thus, by disposing a small Peltier element 11 in a part of that space, the humidity controller 1 can approximately uniformly control the temperature in the space to a predetermined temperature range. Accordingly, it is also possible to easily control the humidity within the humidity controller 1.

The Peltier element 11 (heating means in Embodiment 2) is disposed within the humidity controller 1, and is provided with a plurality of metallic conductors that are connected to each other. Due to causing current to flow through the metallic conductors in a predetermined direction, the temperature is increased in one junction of the metallic conductors, and the temperature is decreased in another junction of the metallic conductors. By reversing the direction of the current that flows through the metallic conductors, the temperature is decreased in one junction of the metallic conductors, and the temperature is increased in another junction of the metallic conductors. It is possible to change the temperature at the junctions by changing the magnitude of the current that flows through the metallic conductors. In Embodiment 2, the Peltier element 11 is disposed on the back face of the magnetic head 2 relative to the magnetic tape sliding face (the face where a head chip is disposed). In this configuration, it is possible to increase the temperature of the magnetic head 2 and in the vicinity thereof by causing current in a predetermined direction to flow through the Peltier element 11.

The controller 15 performs control such that if the temperature/humidity sensor 4 detects that the humidity of the internal space of the humidity controller 1 has become higher than a predetermined value, the controller 15 increases the amount of current that flows through the Peltier element 11. The controller 15 increases the amount of current, increasing the temperature of the magnetic head 2 and in the vicinity thereof, and thus reducing the relative humidity of the internal space of the humidity controller 1.

In the magnetic tape driving apparatus of Embodiment 2, when recording various information to the magnetic tape 5, first, the magnetic tape cartridge 7 is housed in the cartridge housing 9, and a loading operation of the magnetic tape 5 is performed. When the loading operation is completed, a tape path in which the magnetic tape 5 contacts the magnetic head 2 and the tape guides 6 is formed, as shown in FIG. 1. In this state, by rotating the winding reel 8 in the direction indicated by arrow B with a driving means such as a motor, it is possible to run the magnetic tape 5 in the direction indicated by arrow A. Next, by applying electric power to the magnetic head 2, a data track is formed in a predetermined data band in a recording face of the magnetic tape 5, so that information can be recorded. Note that a description of operation to reproduce information that has been written to the magnetic tape 5 is omitted.

When the magnetic tape driving apparatus 10 is disposed in a high humidity environment (for example, where relative humidity is 80% RH or more), there is a possibility that the friction coefficient of the magnetic head 2 and the magnetic tape 5 will increase, and thus the magnetic tape 5 will stick to the magnetic head 2. In a state in which the magnetic tape 5 is stuck to the magnetic head 2, even if an attempt is made to transport the magnetic tape 5, because magnetic tape sliding speed is unstable, the magnetic head 2 will not be able to properly read information from the magnetic tape 5, and thus the error rate will increase.

In Embodiment 2, the temperature and humidity within the humidity controller 1 are monitored with the temperature/humidity sensor 4, and that information is sent to the controller 15 (see FIG. 4). The controller 15 performs control such that when the humidity being detected with the temperature/humidity sensor 4 has become higher than a predetermined value, current is caused to flow through the Peltier element 11. Alternatively, the controller 15 performs control such that when current is already flowing to the Peltier element 11, the controller 15 increases the amount of current flowing to the Peltier element 11. By increasing the amount of current that flows through the Peltier element 11, the Peltier element 11 is capable of heating the magnetic head 2 as a whole. Due to the temperature of the magnetic head 2 increasing, it is possible to reduce the relative humidity of the internal space of the humidity controller 1.

That is, when current in a predetermined direction is caused to flow through the Peltier element 11, the side of the Peltier element 11 that contacts the magnetic head 2 is heated by the Peltier effect of the Peltier element 11, and the back side (actuator 3 side) of the Peltier element 11 is cooled. Thus, because the inside temperature of the humidity controller 1 becomes higher than the outside temperature, the relative humidity inside of the humidity controller 1 decreases. For example, when the temperature of the environment in which the magnetic tape driving apparatus 10 is installed is 25° C., and the humidity is 80% RH, as shown in FIG. 7, the saturated water vapor amount is 23.1 (g/m$^3$), so a water vapor amount W1 is:

$$W1 = 23.1 \times 0.8 = 18.48 (g/m^3).$$

When the temperature of the environment is raised from 25° C. to 35° C. in this state, the saturated water vapor amount at 35° C. becomes 39.6 (g/m$^3$), so at this time a relative humidity H1 is:

$$H1 = 18.48 / 39.6 \times 100 = 46.7 (\% \ RH).$$

Accordingly, it is possible to lower the relative humidity from 80% RH to 46.7% RH.

According to the first magnetic tape driving apparatus, by providing the temperature/humidity sensor 4, and the controller 15 that controls the amount of current that flows through the Peltier element 11 based on the temperature and humidity information that has been detected in the temperature/humidity sensor 4. It is possible to control the inside of the humidity controller 1 so as to have a desired relative humidity.

Also, the humidity controller 1 has a small space that covers the magnetic head 2 and the actuator 3, so by only disposing a small Peltier element 11 in a part of that space, it is possible to approximately uniformly control the temperature in the space to a predetermined temperature range. Accordingly, it is also possible to easily control the humidity within the humidity controller 1.

[2. Configuration of Second Magnetic Tape Driving Apparatus]

FIG. 5 shows the configuration of a humidity controller in a magnetic tape driving apparatus of Embodiment 2. A Peltier element 21 is disposed on a bottom face 1a inside of a humidity controller 1. The bottom face of the Peltier element 21 contacts the bottom face 1a of the inner face of the humidity controller 1. On the top face of the Peltier element 21, an actuator 3 provided with a magnetic head 2 is disposed. In FIG. 5, the configuration other than the Peltier element 21 is the same as the configuration of the first magnetic tape driving apparatus described above, and so a description thereof is omitted.

In FIG. 5, when current is caused to flow through the Peltier element 21, the inner face side (magnetic head 2 side) of the humidity controller 1 of the Peltier element 21 is heated, and the back side (bottom face 1a side) is cooled. Thus, because the inside temperature of the humidity controller 1 becomes higher than the outside temperature, the relative humidity inside of the humidity controller 1 decreases.

[3. Configuration of Third Magnetic Tape Driving Apparatus]

FIG. 6 shows the configuration of a humidity controller in a magnetic tape driving apparatus of Embodiment 2. A Peltier element 31 is disposed on an inner face of an outside air introduction unit 13 that introduces outside air to the humidity controller 1.

The outside air introduction unit 13 is disposed on an outer face of the humidity controller 1, and has a through hole 13*a* that is in communication with the outside and the inside of the humidity controller 1. The Peltier element 31 is disposed on an inner face of the through hole 13*a*. A fan 14 is disposed within the through hole 13*a*.

The fan 14 is rotationally driven by a driving means (not shown) such as a motor. The fan 14, by being rotated, is capable of evacuating air in the humidity controller 1 to the outside via the through hole 13*a*, and introducing outside air into the humidity controller 1 via the through hole 13*a*. The fan 14 can be configured to be rotationally driven/controlled by the controller 15 (see FIG. 4).

The configuration other than the above is the same as the configuration of the previously described first magnetic tape driving apparatus, so a description thereof is omitted.

In FIG. 6, when current in a predetermined direction is caused to flow through the Peltier element 31, the inner face side of the outside air introduction unit 13 of the Peltier element 31 is heated, and the back side (outer face of the outside air introduction unit 13) is cooled. Thus, the temperature inside of the outside air introduction unit 13 becomes higher than the outside temperature.

Furthermore, by rotationally driving the fan 14 to introduce outside air, air that has been heated within the outside air introduction unit 13 is fed into the humidity controller 1, and thus the temperature within the humidity controller 1 increases. When the inside temperature of the humidity controller 1 increases, the inside relative humidity decreases.

[4. Effects, etc. of Embodiment]

According to Embodiment 2, the Peltier element 11 is disposed on the back face of the magnetic head 2, and by controlling the amount of current that flows through the Peltier element 11 based on the temperature and humidity detected with the temperature/humidity sensor 4, it is possible to increase the temperature of the magnetic head 2 and in the vicinity thereof. Thus, it is possible to reduce the relative humidity of the internal space of the humidity controller 1. By reducing the relative humidity of the internal space of the humidity controller 1, it is possible to reduce the friction coefficient of the magnetic head 2 and the magnetic tape 5, and thus possible to suppress sticking of the magnetic head 2 and the magnetic tape 5. Therefore, it is possible to suppress a reduction in the sliding speed of the magnetic tape 5 relative to the magnetic head 2 when transporting the magnetic tape 5, and thus possible to suppress an increase in the error rate of the magnetic tape 5.

By adopting a configuration in which the magnetic head 2, the temperature/humidity sensor 4, and the Peltier element 11 are disposed in the humidity controller 1 (case), the space in which the temperature and humidity are detected in the temperature/humidity sensor 4 is only the space within the humidity controller 1. It is possible to quickly detect changes in the humidity and temperature of the magnetic head 2 and in the vicinity thereof. Because the humidity controller 1 has a comparatively small space, and so the humidity in that space is easily changed according to control of current to the Peltier element 11, humidity can easily be controlled in the humidity controller 1.

By realizing a heating means with the Peltier element 11, it is possible to adjust the temperature and humidity of the magnetic head 2 and in the vicinity thereof according to the magnitude of current. Accordingly, it is possible to change the relative humidity of the magnetic head 2 and in the vicinity thereof with a simple configuration.

In addition, due to the Peltier element 11 being joined to the back face of the magnetic tape sliding face of the magnetic head 2, it is possible to quickly change the temperature and humidity of the magnetic head 2 and in the vicinity thereof. Thus, it is possible to suppress the phenomenon of the magnetic tape 5 sticking to the magnetic head 2 and thus to suppress an increase in error rate even in a high humidity environment.

The Peltier element 31 is disposed in the outside air introduction unit 13 disposed on the outside face of the humidity controller 1, and the fan 14 is provided in order to introduce air that has been heated with the Peltier element 31 into the humidity controller 1. By the controller 15 controlling the amount of current that flows through the Peltier element 31 based on the humidity detected with the temperature/humidity sensor 4 to heat the air, and introducing the heated air into the humidity controller 1 using the fan 14, it is possible to increase the temperature inside of the humidity controller 1. By increasing the temperature inside of the humidity controller 1, it is possible to reduce the relative humidity inside of the humidity controller 1. By reducing the relative humidity inside of the humidity controller 1, it is possible to suppress the phenomenon of the magnetic tape 5 sticking to the magnetic head 2. Thus, it is possible to suppress an increase in the error rate of the magnetic tape 5.

Note that in the third magnetic tape driving apparatus in Embodiment 2, the Peltier element 31 is disposed on the inside face of the outside air introduction unit 13. But the same effects as in Embodiment 2 can be obtained by adopting a configuration in which four approximately plate-like Peltier elements are attached together so as to form an outside air introduction unit provided with a hole.

In addition, in Embodiment 2, the temperature/humidity sensor 4 is a single unit, but separate units may be used for a temperature sensor and a humidity sensor.

In addition, in Embodiment 2, the disposed positions of the Peltier elements 11, 21, and 31 are only examples. As long as it is possible to use the Peltier element to increase the temperature of the magnetic head 2 and in the vicinity thereof, or the temperature within the humidity controller 1, and thus reduce the relative humidity, the positions indicated in Embodiment 2 are not limitations.

In addition, the Peltier elements 11, 21, and 31 in Embodiment 2 are examples of a heating means of the invention. The temperature/humidity sensor 4 in Embodiment 2 is an example of a detection means of the invention. The configuration that transports the magnetic tape 5, such as the winding reel 8 and the tape guide 6, in Embodiment 2 is an example of a transport means of the invention. The humidity controller 1 in Embodiment 2 is an example of a case of the invention. The controller 15 in Embodiment 2 is an example of a control means of the invention.

5. Examples Of Magnetic Tape Driving Apparatus

The problem of an increase in error rate in a high humidity environment occurs in various states depending on the combination of magnetic tape and magnetic tape driving apparatus that are used. Normally, staining is likely to occur when humidity becomes less than 20% RH, and the magnetic tape is likely to stick to the magnetic head when humidity exceeds 80% RH. Accordingly, it is preferable that the humidity within the humidity controller is controlled to a range of 20 to 80% RH, and more preferably is controlled to a range of 30 to 70% RH.

Below, the invention is more specifically described by use of examples, but the invention is not limited by these examples.

5-1. Example 4

First, a non-magnetic coating and magnetic coating were applied in this order on one primary face of polyester film with a thickness of 6 μm. The non-magnetic coating containing carbon black, acicular iron oxide powder, and a binder resin. The magnetic coating containing magnetic powder (average particle diameter 60 nm, retentive force Hc=149.6 kA/m (1880 oersted)), alumina powder (average particle diameter 0.2 μm), and a binder resin.

Next, a drying process and a calendaring process were performed on the polyester film to which the various coatings had been applied. Then, a non-magnetic layer with a thickness of 1.4 μm and a magnetic layer with a thickness of 0.15 μm were formed on the polyester film.

Next, a carbon coating containing carbon black, granular iron oxide powder, and a binder resin was applied on another primary face of polyester film. Then, a backcoat layer with a thickness of 0.6 μm was formed on the polyester film, thus producing a jumbo roll.

Next, the jumbo roll was cut with a ½ inch width to produce a pancake tape. Then, a servo signal was recorded to the magnetic layer of the pancake tape using a servo writer, producing a magnetic tape for use with an LTO cartridge. This magnetic tape was incorporated into an LTO cartridge, and used as a magnetic tape for insulation.

The humidity controller 1 shown in FIG. 5 was incorporated into an LTO drive (Ultrium 960 drive made by Hewlett Packard Japan) to produce a magnetic tape driving apparatus according to the invention. With this magnetic tape driving apparatus in an environment of relative humidity 80% RH and temperature 30° C., durability running testing of the magnetic tape for evaluation was performed. Data was written to a region of the magnetic tape incorporated in the cartridge having a capacity of about 250 MB (about 20 m), and afterward, the written data (same capacity) was read. With processing of reading the data written to the magnetic tape in this way used as one path, durability running testing of 25000 paths was performed. At that time, the durability running testing was performed while controlling the amount of current that flowed to the Peltier element such that humidity in the humidity controller was about 50% RH.

5-2. Examples 5

In Example 5, current was caused to flow through the Peltier element when the recording capacity of the magnetic tape (amount of data that can be written to the magnetic tape) decreased to 75% of the recording capacity of the magnetic tape when starting the durability running testing.

Next, while controlling the amount of current such that the humidity within the humidity controller was about 50% RH, running of 25000 paths was performed.

The content of durability running testing other than the above was the same as in Example 4.

5-3. Examples 6

In Example 6, confirming the humidity control effect due to cooling the inside of the humidity controller using the Peltier element. Durability running testing was started without causing current to flow through the Peltier element, followed by waiting until a decrease (deterioration) in the recording capacity of the magnetic tape of at least 10% from the recording capacity when starting durability running testing was observed. After the recording capacity of the magnetic tape deteriorated, the temperature within the humidity controller was increased by 5° C. at each 1000 paths by controlling the amount of current that flowed to the Peltier element, until recovering recording capacity. In this durability running testing, the magnetic tape was run for 25000 paths. The content of durability running testing other than the above was the same as in Example 4.

5-4. Comparative Example 2

In Comparative Example 2, the magnetic tape was run for 25000 paths, without causing current to flow through the Peltier element from start to finish of the durability running testing. The content of durability running testing other than the above was the same as in Example 4.

[5-5. Evaluation of Running Durability]

Data having a capacity of about 250 MB (about 20 m) was written to a data recordable region of the magnetic tape, and afterward, 25000 paths of running the magnetic tape were performed, using reading of the data written to the magnetic tape as one path. The change in recording capacity accompanying the error rate increase was obtained for each path. Durability was evaluated using the amount of decrease in the capacity (recording capacity) of usable regions due to an increase in the error rate. The evaluation results are shown in Table 3 and Table 4. In the rows marked 'capacity' in Tables 3 and 4, a zero decrease in the amount of recording capacity is indicated by 'A', a decrease of less than 10% in the amount of recording capacity is indicated by 'B', and a decrease of 10% or more in the amount of recording capacity is indicated by 'C'. In the rows marked 'sticking/noise', 'N' indicates that no noise was produced due to sticking of the magnetic tape and the magnetic head, and 'Y' indicates that noise did occur.

TABLE 3

| | | number of paths 1 = 1000 paths | | | | | | | | | | | | | | | | | | | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Ex. 4 | capacity | A | A | A | A | A | A | A | A | A | A | A | A | A | A | A | A | A | A | A | A | A | A | A | A | A |
| | sticking noise | N | N | N | N | N | N | N | N | N | N | N | N | N | N | N | N | N | N | N | N | N | N | N | N | N |
| Ex. 5 | capacity | A | A | A | A | A | A | A | A | A | A | A | A | A | B | C | A | A | A | A | A | A | A | A | A | A |
| | sticking noise | N | N | N | N | N | N | N | N | N | N | N | N | N | Y | Y | N | N | N | N | N | N | N | N | N | N |
| Com. Ex. 2 | capacity | A | A | A | A | A | A | A | A | A | A | A | A | B | B | C | C | C | — | — | — | — | — | — | — | — |
| | sticking noise | N | N | N | N | N | N | N | N | N | N | N | N | N | Y | Y | Y | Y | Y | — | — | — | — | — | — | — |

TABLE 4

| | | | | | | | | | | | | | number of paths 1 = 1000 paths | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Ex. 6 capacity | A | A | A | A | A | A | A | A | A | A | A | A | A | B | C | B | A | A | A | A | A | A | A | A | A |
| sticking noise | N | N | N | N | N | N | N | N | N | N | N | N | N | Y | Y | Y | N | N | N | N | N | N | N | N | N |
| internal temperature (° C.) | | | | | | | | 30 | | | | | | | | 35 | 40 | | | | 45 | | | | |
| relative humidity (% RH) | | | | | | | | 81 | | | | | | | | 65 | 49 | | | | 40 | | | | |

Figure 10:
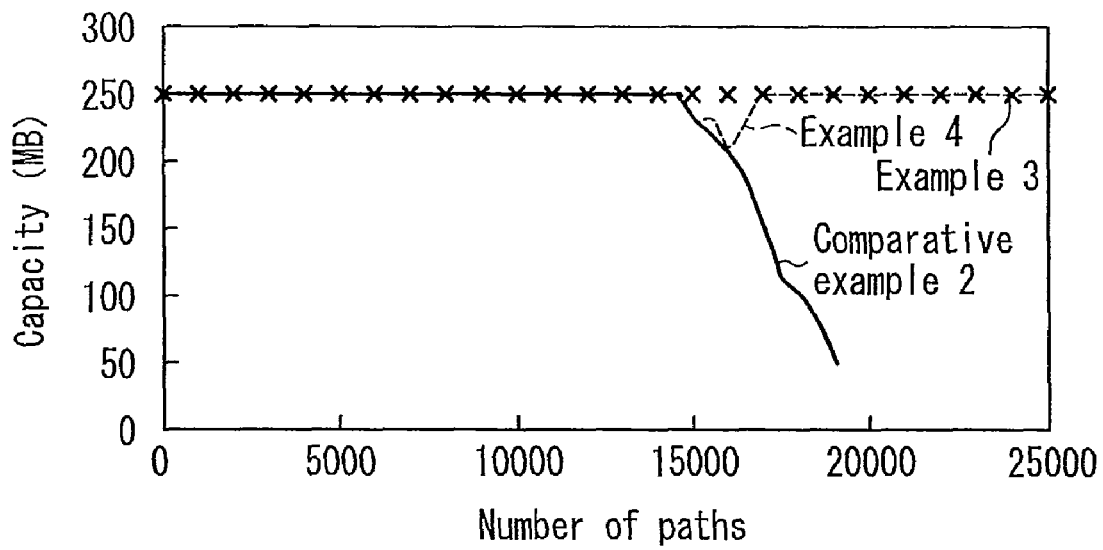
FIG. 10 is a graph that shows the relationship between the number of running passes when a durability test was performed and usable capacity.
Figure 11:
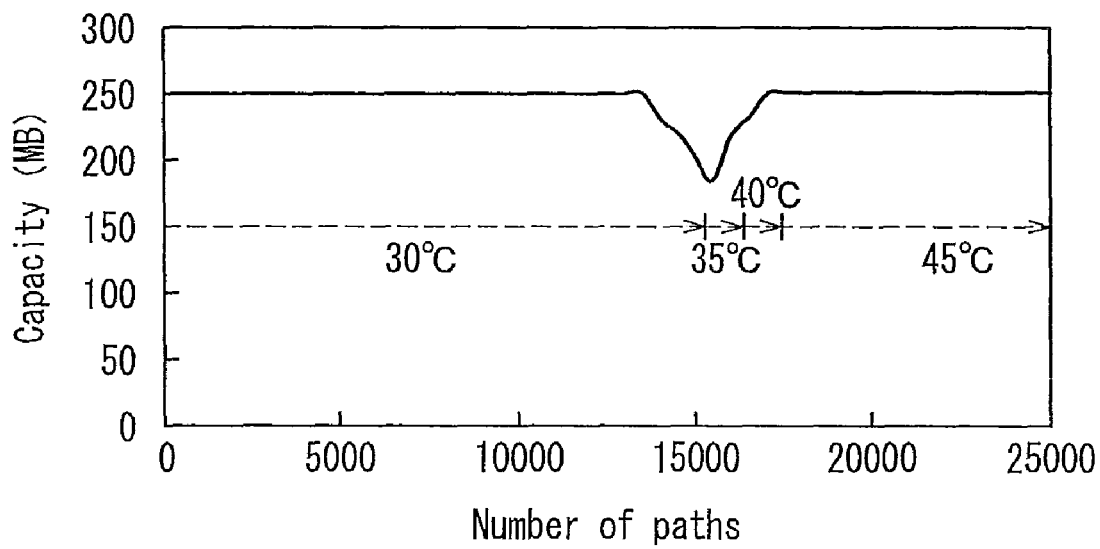
FIG. 11 is a graph that shows the relationship between the number of running passes when a durability test was performed and usable capacity.

FIGS. 10 and 11 show changes in the recording capacity. As shown in FIG. 10 and Table 3, in Example 4, a decrease in the recording capacity was not seen in all 25000 paths, but in Comparative Example 2, a decrease in the recording capacity was seen from about 15000 paths onward.

Note that in Example 5, current was first caused to flow through the Peltier element after the recording capacity decreases, so a decrease in the recording capacity and occurrence of noise was seen at about 15000 to 16000 paths. However, after about 17000 paths, when the temperature in the humidity controller had been increased with the Peltier element, the recording capacity recovered to a normal value, and occurrence of noise was suppressed.

Thus, it was clear that according to the magnetic tape driving apparatus in Examples 4 and 5, regardless of the external temperature and humidity, by keeping an appropriate humidity in the vicinity of the magnetic head, i.e. within the humidity controller 1. It was possible to suppress sticking of the magnetic tape to the magnetic head, thereby improving the error rate, and it was possible to suppress the occurrence of noise due to the magnetic tape sticking to the magnetic head.

In addition, as shown in FIG. 11 and Table 4, when a state of high humidity (81% RH) continues within the humidity controller, at about 14000 to 15000 paths the magnetic tape sticks to the magnetic head and the error rate increases. However, by increasing the temperature within the humidity controller by 5° C. at a time and thus decreasing the relative humidity (after about 16000 paths), it was possible to suppress sticking of the magnetic tape to the magnetic head, thereby decreasing the error rate. It was also possible to suppress the occurrence of noise due to the magnetic tape sticking to the magnetic head.

The magnetic tape driving apparatus of the invention is useful in a tape drive that is capable of running magnetic tape.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic tape driving apparatus comprising:
   a transport means that transports a magnetic tape, and
   a magnetic head that is capable of recording/reproduction of information on the magnetic tape;
   a detection means that detects the temperature and humidity of the magnetic head or in the vicinity of the magnetic head;
   a temperature adjusting means capable of adjusting the temperature of the magnetic head or in the vicinity of the magnetic head;
   a control means that controls the temperature adjusting means based on the temperature and humidity detected with the detection means; and
   a case that is disposed inside of the magnetic tape driving apparatus and has a pair of holes through which the magnetic tape can pass,
   the case housing the magnetic head, the detection means, and the temperature adjusting means,
   the control means controlling the temperature adjusting means so as to decrease the temperature of the magnetic head and in the vicinity of the magnetic head when the humidity of the magnetic head or in the vicinity of the magnetic head that the detection means detects is less than a predetermined value, and
   the control means controlling the temperature adjusting means so as to increase the temperature of the magnetic head and in the vicinity of the magnetic head when the humidity of the magnetic head or in the vicinity of the magnetic head that the detection means detects is higher than a predetermined value.

2. The magnetic tape driving apparatus according to claim 1, wherein the temperature adjusting means is configured with a Peltier element.

3. The magnetic tape driving apparatus according to claim 1, wherein the temperature adjusting means is joined to the back face of a magnetic tape sliding face of the magnetic head.

4. A magnetic tape driving apparatus comprising:
   a transport means that transports a magnetic tape, and
   a magnetic head that is capable of recording/reproduction of information on the magnetic tape;
   a detection means that detects the temperature and humidity of the magnetic head or in the vicinity of the magnetic head;
   a cooling means capable of decreasing the temperature of the magnetic head or in the vicinity of the magnetic head;
   a control means that controls the cooling means based on the temperature and humidity detected with the detection means; and
   a case that is disposed inside of the magnetic tape driving apparatus and has a pair of holes through which the magnetic tape can pass, the case housing the magnetic head, the detection means, and the cooling means, and the control means controlling the cooling means so as to decrease the temperature of the magnetic head and in the vicinity of the magnetic head when the humidity of the magnetic head or in the vicinity of the magnetic head that the detection means detects is less than a predetermined value.

5. The magnetic tape driving apparatus according to claim 4, wherein the cooling means is configured with a Peltier element.

6. The magnetic tape driving apparatus according to claim 4, wherein the cooling means is joined to the back face of a magnetic tape sliding face of the magnetic head.

7. The magnetic tape driving apparatus according to claim 4, further comprising:
- an outside air introduction unit that is formed on a surface of the case and has a space in communication with the inside and outside of the case; and
- a fan disposed in the internal space of the outside air introduction unit;
- wherein the cooling means is disposed inside of the outside air introduction unit, and
- the fan introduces air that has been cooled with the cooling means into the case.

8. A magnetic tape driving apparatus comprising:
- a magnetic tape cartridge housing, a transport means that transports a magnetic tape that has been housed in the magnetic tape cartridge,
- a reeling unit that reels in magnetic tape that has been drawn out from the magnetic tape housed in the magnetic tape cartridge, and
- a magnetic head that performs recording/reproduction of information on the magnetic tape;
- a cooling means capable of decreasing the temperature of the magnetic head or in the vicinity of the magnetic head;
- a detection means that detects the temperature and humidity of the magnetic head or in the vicinity of the magnetic head;
- a control means that controls the cooling means based on information of the temperature and humidity obtained with the detection means; and
- a case that is disposed inside of the magnetic tape driving apparatus and has a pair of holes through which the magnetic tape can pass, the case housing the magnetic head, the detection means, and the cooling means, and the control means controlling the cooling means so as to decrease the temperature of the magnetic head and in the vicinity of the magnetic head when the humidity of the magnetic head or in the vicinity of the magnetic head that the detection means detects is less than a predetermined value.

9. A magnetic tape driving apparatus comprising
- a transport means that transports a magnetic tape, and
- a magnetic head that is capable of recording/reproduction of information on the magnetic tape;
- a case that is disposed inside of the magnetic tape driving apparatus and has a pair of holes through which the magnetic tape can pass;
- a detection means that detects the temperature and humidity within the case;
- a heating means capable of increasing the temperature within the case; and
- a control means that controls the heating means based on the humidity detected with the detection means;
- the case housing the magnetic head, the detection means, and the heating means, and
- the control means controlling the heating means so as to increase the temperature within the case when the humidity within the case that the detection means detects is higher than a predetermined value.

10. The magnetic tape driving apparatus according to claim 9, wherein the heating means is configured with a Peltier element.

11. The magnetic tape driving apparatus according to claim 9, wherein the heating means is joined to the back face of a magnetic tape sliding face of the magnetic head.

12. The magnetic tape driving apparatus according to claim 9, further comprising:
- an outside air introduction unit that is formed on a surface of the case and has a space in communication with the inside and outside of the case; and
- a fan disposed in the internal space of the outside air introduction unit;
- wherein the heating means is disposed inside of the outside air introduction unit, and
- the fan introduces air that has been heated with the heating means into the case.

* * * * *